US012625345B2

(12) United States Patent
Kwon et al.

(10) Patent No.:  US 12,625,345 B2
(45) Date of Patent:      May 12, 2026

(54) CAMERA MODULE

(71) Applicant: SAMSUNG ELECTRO-MECHANICS CO., LTD., Suwon-si (KR)

(72) Inventors: Young Hwan Kwon, Suwon-si (KR); Su Kyeong Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 324 days.

(21) Appl. No.: 18/366,240

(22) Filed: Aug. 7, 2023

(65) Prior Publication Data

US 2024/0176097 A1      May 30, 2024

(30) Foreign Application Priority Data

Nov. 28, 2022      (KR) ........................ 10-2022-0162068
Dec. 28, 2022      (KR) ........................ 10-2022-0187747

(51) Int. Cl.
G02B 7/08              (2021.01)

(52) U.S. Cl.
CPC ..................................... G02B 7/08 (2013.01)

(58) Field of Classification Search
CPC ... G02B 7/02; G02B 7/04; G02B 7/08; G02B 7/09; G02B 7/10; H04N 23/57;
(Continued)

(56) References Cited

U.S. PATENT DOCUMENTS

2016/0085086 A1*    3/2016   Rho ..................... H04N 23/682
                                                                       359/557
2016/0161757 A1*    6/2016   Hee ..................... G02B 27/646
                                                                       359/557
(Continued)

FOREIGN PATENT DOCUMENTS

CN          114500777 A      5/2022
JP          2016-051078 A      4/2016
(Continued)

OTHER PUBLICATIONS

Korean Office Action Issued on Feb. 21, 2025, in Counterpart Korean Patent Application No. 10-2022-0187747 (9 Pages in English, 7 Pages in Korean).
(Continued)

*Primary Examiner* — Balram T Parbadia
*Assistant Examiner* — Seth D Moser
(74) *Attorney, Agent, or Firm* — NSIP Law

(57) ABSTRACT

A camera module includes a housing having an internal space, a carrier accommodated in the housing and being movable relative to the housing in a direction perpendicular to an optical axis, a ball member disposed between the housing and the carrier, a lens module accommodated in the carrier and movable in an optical axis direction relative to the carrier, an elastic unit connected to the carrier and the lens module, and a driving unit providing driving force to the lens module and the carrier, wherein the driving unit includes a magnet unit disposed on the carrier, a first coil unit disposed in the lens module, and a second coil unit disposed in the housing, and a first signal pattern is disposed in the housing, and the first signal pattern is electrically connected to the elastic unit.

31 Claims, 20 Drawing Sheets

(58) Field of Classification Search

CPC .......... H04N 23/687; G03B 2205/0046; G03B 2205/0053; G03B 2205/0069

USPC ................................................. 359/823, 824

See application file for complete search history.

(56) References Cited

U.S. PATENT DOCUMENTS

| | | | | |
|---|---|---|---|---|
| 2017/0254979 | A1 | 9/2017 | Bai | |
| 2020/0218082 | A1* | 7/2020 | Choi | H04N 23/57 |
| 2020/0301095 | A1 | 9/2020 | Sun et al. | |
| 2020/0310148 | A1 | 10/2020 | Chiu et al. | |
| 2021/0116673 | A1* | 4/2021 | Hwang | H04N 23/51 |
| 2022/0252826 | A1 | 8/2022 | Seo et al. | |
| 2022/0272237 | A1 | 8/2022 | Rho et al. | |
| 2022/0353416 | A1 | 11/2022 | Kwon et al. | |
| 2024/0094597 | A1* | 3/2024 | Song | G03B 3/10 |
| 2024/0236452 | A1* | 7/2024 | Oh | G03B 13/36 |
| 2024/0244306 | A1* | 7/2024 | Park | H04N 23/57 |

FOREIGN PATENT DOCUMENTS

| | | | |
|---|---|---|---|
| JP | 2020-166129 | A | 10/2020 |
| JP | 2022-6601 | A | 1/2022 |
| KR | 10-2016-0035244 | A | 3/2016 |
| KR | 10-2019-0061439 | A | 6/2019 |
| KR | 10-2020-0112707 | A | 10/2020 |
| KR | 10-2022-0149424 | A | 11/2022 |

OTHER PUBLICATIONS

Indian Office Action issued on Nov. 25, 2025, in counterpart Indian Patent Application No. 202314053946 (7 pages in English and Hindi dual text).

* cited by examiner

CAMERA MODULE

CROSS-REFERENCE TO RELATED APPLICATIONS

This application claims the benefit under 35 USC 119(a) of Korean Patent Application Nos. 10-2022-0162068 filed on Nov. 28, 2022, and 10-2022-0187747 filed on Dec. 28, 2022, in the Korean Intellectual Property Office, the entire disclosures of which are incorporated herein by reference for all purposes.

BACKGROUND

1. Field

The present disclosure relates to a camera module.

2. Description of the Background

Camera modules may be adopted in mobile communication terminals, such as smartphones, tablet PCs, and laptop computers.

In addition, camera modules may be equipped with an actuator having a focus adjustment function and an optical image stabilization function in order to generate a high-resolution image.

For example, the focus may be adjusted by moving a lens module in a direction of an optical axis, or image stabilization may be performed by moving the lens module in a direction perpendicular to the optical axis.

A plurality of suspension wires may be used to support movement of the lens module during shake correction. In this case, the plurality of suspension wires may also serve to supply power to an image stabilization coil.

However, there may be a problem in that the plurality of suspension wires may be deformed because they are vulnerable to external impact.

In addition, the lens module may be rotated for reasons, such as a variation in driving force during image stabilization, but it may be difficult to prevent the lens module from being rotated through a plurality of suspension wires.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an internal space, a carrier accommodated in the housing and being movable relative to the housing in a direction perpendicular to an optical axis, a ball member disposed between the housing and the carrier, a lens module accommodated in the carrier and movable in an optical axis direction relative to the carrier, an elastic unit connected to the carrier and the lens module, and a driving unit providing driving force to the lens module and the carrier, wherein the driving unit includes a magnet unit disposed on the carrier, a first coil unit disposed in the lens module, and a second coil unit disposed in the housing, and a first signal pattern is disposed in the housing, and the first signal pattern is electrically connected to the elastic unit.

A wiring pattern may be disposed inside the lens module, and the wiring pattern may be electrically connected to the first coil unit and the elastic unit.

An end of the wiring pattern may be exposed to an upper portion of the lens module and may be electrically connected to the elastic unit.

An end of the wiring pattern may be exposed to a lower portion of the lens module and may be electrically connected to the elastic unit.

The elastic unit may include a first elastic member connecting an upper portion of the lens module to an upper portion of the carrier and a second elastic member connecting a lower portion of the lens module to a lower portion of the carrier, the second elastic member may include a first fixed portion coupled to the lower portion of the lens module and a second fixed portion coupled to the lower portion of the carrier, and the end of the wiring pattern may be electrically connected to the first fixed portion.

A second signal pattern may be disposed inside the carrier, one end and the other end of the second signal pattern may be exposed to upper and lower portions of the carrier, the one end of the second signal pattern exposed to the lower portion of the carrier may be electrically connected to the second fixed portion, and the other end of the second signal pattern exposed to the upper portion of the carrier may be electrically connected to the first elastic member.

A column portion extending in the optical axis direction may be disposed in the housing, and the first signal pattern may be disposed in the column portion, and a wiring pattern may be disposed inside the lens module, and the elastic unit may be electrically connected to the wiring pattern.

The column portion may be disposed in a corner region of the housing.

A guide recess in which the ball member may be disposed may be formed on at least one of surfaces of the housing and the carrier facing each other in the optical axis direction, and a distance from a center of the guide recess to an edge of the guide recess may be greater than a distance from the center of the guide recess to one sidewall of the guide recess.

The second coil unit may include a plurality of coils, a plurality of guide recesses in which the ball member may be disposed may be formed on at least one of surfaces of the housing and the carrier facing each other in the optical axis direction, each guide recess may be disposed between the column portion and each coil of the second coil unit, and when a figure in which lines extending in a longitudinal direction of each coil of the second coil unit from a center of each coil meet each other is referred to as a first figure and a figure formed by connecting centers of the plurality of guide recesses to each other is referred to as a second figure, the second figure may have an inclined shape with respect to the first figure.

An area of the first figure may be larger than an area of the second figure.

The elastic unit may include a first elastic member connecting an upper portion of the lens module and an upper portion of the carrier and a second elastic member connecting a lower portion of the lens module and a lower portion of the carrier, the first elastic member may include a first coupling portion coupled to the upper portion of the lens module, a second coupling portion coupled to the upper portion of the carrier, and a third coupling portion coupled to the housing, and the first signal pattern may be electrically connected to the third coupling portion.

The first elastic member may include a first support portion connecting the first coupling portion to the second coupling portion and a first bent portion and a second bent portion connecting the second coupling portion to the third coupling portion.

The first bent portion and the second bent portion may be bent multiple times in a direction perpendicular to the optical axis, and a direction in which the first bent portion is bent and a direction in which the second bent portion is bent may be different from each other.

A yoke member may be disposed in the housing and face the magnet unit in the optical axis direction.

The first coil unit and the magnet unit may be disposed to face each other in a direction perpendicular to the optical axis, and the second coil unit and the magnet unit may be disposed to face each other in the optical axis direction.

The driving unit may include a first position sensor unit facing the magnet unit in a direction perpendicular to the optical axis, and a second position sensor unit and a third position sensor unit facing the magnet unit in the optical axis direction, and any one of the second position sensor unit and the third position sensor unit may include two Hall sensors.

The magnet unit may include a first magnet and a second magnet disposed on an inner side surface of the carrier, the second coil unit may include a first coil facing the first magnet and a second coil facing the second magnet, and the two Hall sensors may each face one of the first magnet and the second magnet in the optical axis direction.

The magnet unit may include two first magnets spaced apart from each other in a first axis direction perpendicular to the optical axis, and two second magnets spaced apart from each other in a second axis direction perpendicular to both the optical axis and the first axis direction, the second coil unit may include two first coils facing the two first magnets and two second coils facing the two second magnets, and one of the two Hall sensors may face the first magnet, and the other may face the second magnet.

In another general aspect, a camera module includes a housing having an internal space, a carrier accommodated in the housing and being movable relative to the housing in a direction perpendicular to an optical axis, a ball member disposed between the housing and the carrier, a lens module accommodated in the carrier and movable in an optical axis direction relative to the carrier, an elastic unit connected to the carrier and the lens module, a driving unit including a magnet unit disposed in the carrier and including a plurality of magnets, a first coil unit disposed in the lens module, and a second coil unit disposed in the housing and including a plurality of coils, a first position sensor unit disposed to face the magnet unit in a direction perpendicular to the optical axis, and a second position sensor unit and a third position sensor unit disposed to face the magnet unit in the optical axis direction, wherein a magnet facing the second position sensor unit and a magnet facing the third position sensor unit are disposed perpendicular to each other, and any one of the second position sensor unit and the third position sensor unit includes two Hall sensors.

A number of the plurality of coils of the second coil unit may be greater than a number of the plurality of magnets.

The two Hall sensors may each face one of the plurality of magnets.

The two Hall sensors may be disposed to face different magnets, respectively, and the different magnets may be parallel to each other.

A wiring pattern may be disposed inside the lens module and may be electrically connected to the first coil unit and the elastic unit, and a first signal pattern may be disposed in the housing and may be electrically connected to the elastic unit.

In another general aspect, a camera module includes a housing having an internal space, a carrier accommodated in the housing movable relative to the housing in a direction perpendicular to an optical axis, a lens module accommodated in the carrier and movable in an optical axis direction relative to the carrier, an elastic unit connected to the carrier and the lens module, and a first signal pattern disposed in the housing, wherein the elastic unit electrically connects the first signal pattern to the lens module.

The camera module may further include a ball member disposed between the housing and the carrier, wherein the carrier may be disposed on the ball member.

The camera module may further include a guide recess in which the ball member may be disposed formed on at least one of surfaces of the housing and the carrier facing each other in the optical axis direction, wherein a distance from a center of the guide recess to an edge of the guide recess may be greater than a distance from the center of the guide recess to one sidewall of the guide recess.

The camera module may further include a driving unit providing driving force to the lens module and the carrier, wherein the driving unit may include a magnet unit disposed on the carrier, a first coil unit disposed in the lens module, and a second coil unit disposed in the housing.

The camera module may further include a wiring pattern disposed inside the lens module, wherein the wiring pattern may be electrically connected to the first coil unit and the elastic unit.

The camera module may further include a first position sensor unit disposed to face the magnet unit in a direction perpendicular to the optical axis, and a second position sensor unit and a third position sensor unit disposed to face the magnet unit in the optical axis direction, wherein the magnet unit may include first and second magnets disposed perpendicular to each other, the second coil unit may include first and second coils facing the first and second magnets, respectively, in the optical axis direction, one of the first and second coils may include multiple coils facing a corresponding one of the first or second magnet, and a number of the position sensors may correspond to the number of multiple coils.

The first coil unit may face the magnet unit in a direction perpendicular to the optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
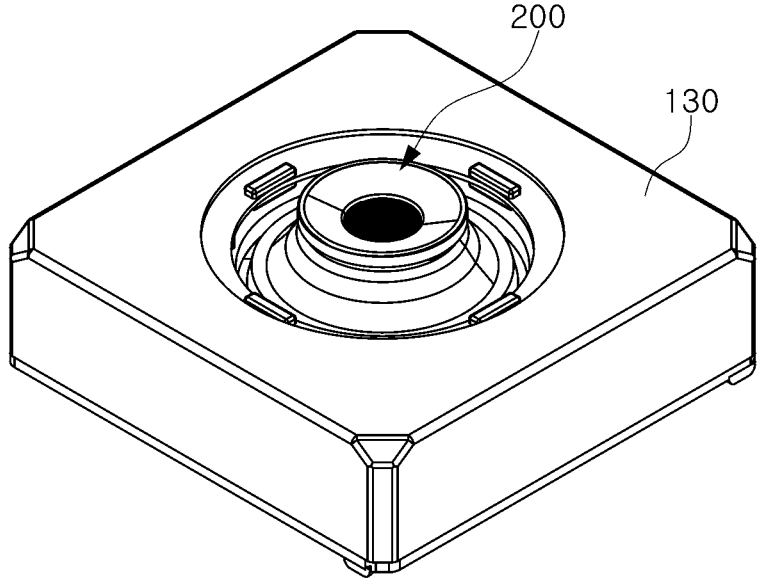
FIG. 1 is a perspective view of a camera module according to an example embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

In this specification, an optical axis (a Z-axis) direction may refer to a direction in which the optical axis (the Z-axis) is elongated vertically or a direction parallel to the optical axis (the Z-axis).

A first axis (an X-axis) direction may refer to a direction, perpendicular to the optical axis (the Z-axis) direction, and a second axis (a Y-axis) direction may refer to a direction, perpendicular to both the optical axis (the Z-axis) direction and the first axis (the X-axis) direction.

A camera module according to an example embodiment of the present disclosure may be mounted on a portable electronic device. The portable electronic device may be a portable electronic device, such as a mobile communications terminal, a smartphone, or a tablet PC.

One or more example embodiments disclosed herein provide an optical image stabilizer for a camera module and a camera module capable of improving an optical image stabilization function.

Figure 2:
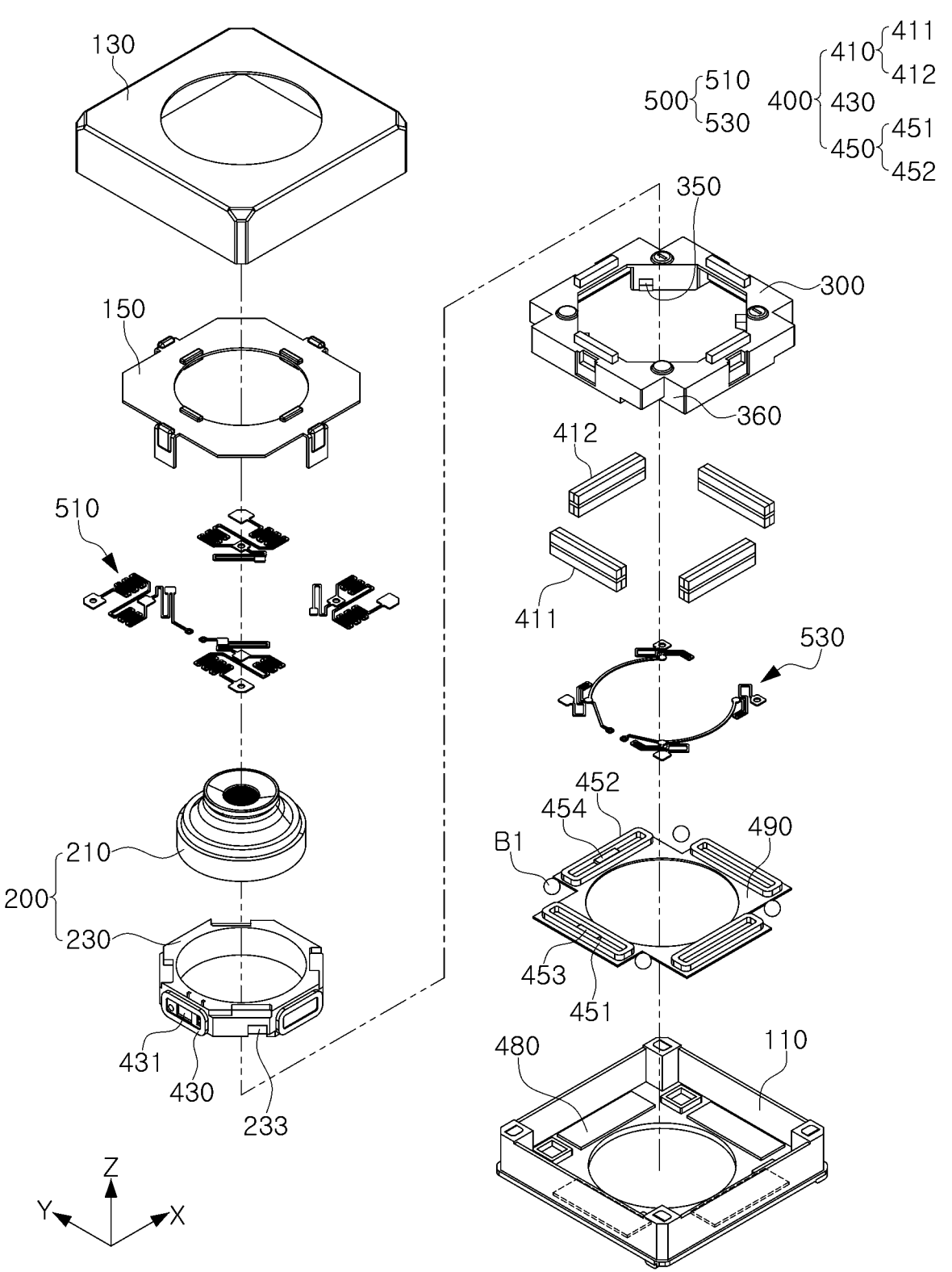
FIG. 2 is a schematic exploded perspective view of a camera module according to an example embodiment of the present disclosure.

FIG. 1 is a perspective view of a camera module according to an example embodiment of the present disclosure, and FIG. 2 is a schematic exploded perspective view of a camera module according to an example embodiment of the present disclosure.

Referring to FIGS. 1 and 2, a camera module according to an example embodiment of the present disclosure includes a lens module 200, a carrier 300, a driving unit 400 and a housing 110.

The lens module 200 includes at least one lens and a lens barrel 210. The at least one lens may be disposed inside the lens barrel 210. When a plurality of lenses are provided, the plurality of lenses may be mounted inside the lens barrel 210 on the optical axis (the Z-axis) in the optical axis (the Z-axis) direction.

The lens module 200 may further include a lens holder 230 coupled to the lens barrel 210.

The lens holder 230 may have a hollow portion passing through the lens holder 230 in the optical axis (the Z-axis) direction, and the lens barrel 210 may be inserted into the hollow portion and fixed with respect to the lens holder 230. Accordingly, the lens barrel 210 and the lens holder 230 may move together in the optical axis (the Z-axis) direction.

The carrier 300 may have an internal space and may have a box shape with open top and bottom surfaces. The lens module 200 may be accommodated in the carrier 300. The lens module 200 may be movable in the optical axis (the Z-axis) direction relative to the carrier 300.

In an example embodiment of the present disclosure, during autofocusing (AF), the lens module 200 is a moving member moving in the optical axis (the Z-axis) direction, and the carrier 300 is a fixed member not moving in the optical axis (the Z-axis) direction.

The lens module 200 may be supported by the carrier 300 by an elastic portion 500. The elastic unit 500 may include a first elastic member 510 and a second elastic member 530. The first elastic member 510 may be disposed above the lens module 200 and above the carrier 300. For example, the first elastic member 510 may be disposed on an upper side of the lens module 200 and the lens barrel 210 may protrude above the first elastic member 510 in some configurations. The second elastic member 530 may be disposed below the lens module 200 and below the carrier 300. For example, the second elastic member 530 may be disposed on a lower side of the lens module 200 and the lens barrel 210 may protrude below the second elastic member 530 in some configurations.

By means of the first elastic member 510 and the second elastic member 530, the lens module 200 may be supported by the carrier 300 to be movable in the optical axis (the Z-axis) direction.

The carrier 300 may be accommodated in the housing 110 and may be movable relative to the housing 110 in a direction perpendicular to the optical axis (the Z-axis). Since the lens module 200 is accommodated in the carrier 300, the carrier 300 and the lens module 200 may be moved together in a direction perpendicular to the optical axis (the Z-axis).

In an example embodiment of the present disclosure, during optical image stabilization (OIS), the lens module 200 and the carrier 300 are moving members moving in a direction perpendicular to the optical axis (the Z-axis), and the housing 110 is a fixed member that does not move in the direction perpendicular to the optical axis (the Z-axis).

The carrier 300 is a moving member in the case of OIS and a fixed member in the case of AF.

A ball member B1 may be disposed between the carrier 300 and the housing 110.

The ball member B1 may be disposed to contact each of the carrier 300 and the housing 110.

When the carrier 300 is relatively moved or rotated with respect to the housing 110, the ball member B1 may roll between the carrier 300 and the housing 110 to support the movement of the carrier 300.

A case 130 may be coupled to the housing 110 to protect internal components of the camera module.

Figure 3:
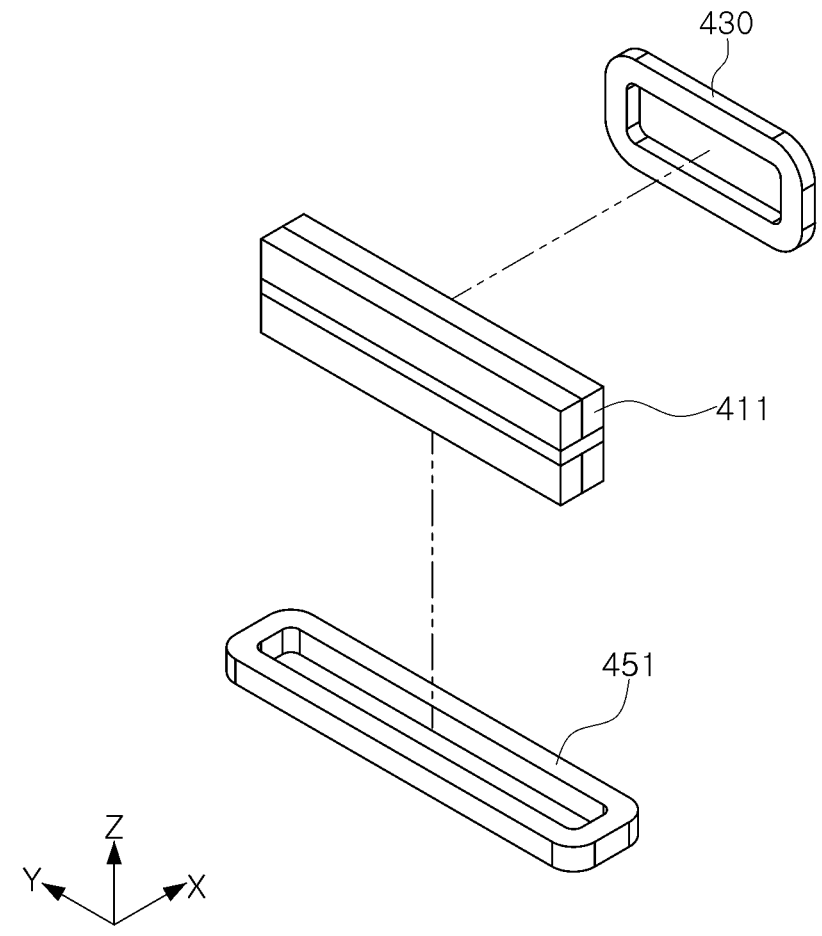
FIG. 3 is a view of a driving unit of a camera module according to an example embodiment of the present disclosure.

FIG. 3 is a view of a driving unit of a camera module according to an example embodiment of the present disclosure.

Referring to FIG. 3, a camera module according to an example embodiment of the present disclosure includes a driving unit 400 moving the lens module 200 and the carrier 300.

The driving unit 400 may generate driving force in the optical axis (the Z-axis) direction to move the lens module 200 in the optical axis (the Z-axis) direction, and generate driving force in a direction perpendicular to the optical axis (the Z-axis), to move the lens module 200 and the carrier 300 in a direction perpendicular to the optical axis (the Z-axis).

The driving unit 400 includes a magnet unit 410, a first coil unit 430 and a second coil unit 450. The magnet unit 410 and the first coil unit 430 may generate driving force in the optical axis (the Z-axis) direction, and the magnet unit 410 and the second coil unit 450 may generate driving force in a direction perpendicular to the optical axis (the Z-axis).

The magnet unit 410 may include a first magnet 411 and a second magnet 412. The first magnet 411 and the second magnet 412 may be disposed to be perpendicular to each other in a plane perpendicular to the optical axis (the Z-axis).

The first coil unit 430 may include at least one coil.

The second coil unit 450 may include a first coil 451 and a second coil 452. The first coil 451 and the second coil 452 may be disposed to be perpendicular to each other in a plane perpendicular to the optical axis (the Z-axis).

The magnet unit 410 and the first coil unit 430 may function as a focus adjustment driving unit. That is, the focus adjustment driving unit includes the magnet unit 410 and the first coil unit 430.

The magnet unit 410 and the second coil unit 450 may function as an OIS driving unit. That is, the OIS driving unit includes the magnet unit 410 and the second coil unit 450.

Also, the OIS driving unit includes a first sub-driving unit and a second sub-driving unit. The first sub-driving unit may generate driving force in the first axis (the X-axis) direction, and the second sub-driving unit may generate driving force in the second axis (the Y-axis) direction.

The first sub-driving unit includes the first magnet 411 and the first coil 451, and the second sub-driving unit includes the second magnet 412 and the second coil 452.

The magnet unit 410 may be disposed in the carrier 300. For example, each of the first magnet 411 and the second magnet 412 may be disposed on an internal surface of the carrier 300. The first magnet 411 may include one or two magnets. Also, the second magnet 412 may include one or two magnets.

In an example embodiment, two first magnets 411 are provided, and the two first magnets 411 may be spaced apart from each other in the first axis (the X-axis) direction. Also, the two first magnets 411 may be disposed to be parallel to each other. The first magnet 411 has a length in the second axis (the Y-axis) direction.

In an example embodiment, two second magnets 412 are provided, and the two second magnets 412 may be spaced apart from each other in a second axis (the Y-axis) direction. Also, the two second magnets 412 may be disposed to be parallel to each other. The second magnet 412 has a length in the first axis (the X-axis) direction.

A back yoke may be disposed between the magnet unit 410 and the carrier 300. For example, the first magnet 411 and the second magnet 412 may be fixed to the back yoke, and the back yoke may be fixed to an internal surface of the carrier 300.

The back yoke may be formed of a magnetic material, and the driving force may be improved by preventing leakage of magnetic flux of the magnet unit 410.

Each magnet of the magnet unit 410 may be magnetized so that one side (e.g., a side facing the first coil unit 430) thereof has both an N pole and an S pole. For example, one side of each magnet of the magnet unit 410 facing the first coil unit 430 may sequentially have an N pole, a neutral region, and an S pole in the optical axis (the Z-axis) direction.

The other side (e.g., the opposite side of the one side) of each magnet of the magnet unit 410 may be magnetized to have both an S pole and an N pole. For example, the other side of each magnet of the magnet unit 410 may sequentially have an S pole, a neutral region, and an N pole in the optical axis (the Z-axis) direction.

The first coil unit 430 is disposed to face the magnet unit 410. For example, the first coil unit 430 may be disposed to face the magnet unit 410 in a direction perpendicular to the optical axis (the Z-axis). The first coil unit 430 may be disposed in the lens module 200. For example, the first coil unit 430 may be disposed on a side surface of the lens holder 230.

The first coil unit 430 may include the number of coils corresponding to the number of magnets included in the magnet unit 410. Each of the first coil unit 430 may have a donut shape having a hollow, and each coil may be disposed to face each magnet of the magnet unit 410 in a direction perpendicular to the optical axis (the Z-axis). It is also possible for the first coil unit 430 to be provided as a single coil facing each magnet of the magnet unit 410.

During AF, the magnet unit 410 is a fixed member fixed to the carrier 300, and the first coil unit 430 is a moving member mounted on the lens module 200 and moving together with the lens module 200.

When power is applied to the first coil unit 430, the lens module 200 may be moved in the optical axis (the Z-axis) direction by electromagnetic force between the magnet unit 410 and the first coil unit 430.

The magnet unit 410 and the first coil unit 430 may generate driving force in a direction (e.g., the optical axis (the Z-axis) direction) perpendicular to the direction in which the magnet unit 410 and the first coil unit 430 face each other.

Each magnet of the magnet unit 410 may be magnetized so that a lower surface (e.g., a surface facing each coil of the second coil unit 450) has both an N pole and an S pole. For example, the lower surface of each magnet of the magnet unit 410 facing each coil of the second coil unit 450 may sequentially have an N pole, a neutral region, and an S pole in a direction perpendicular to the optical axis (the Z-axis).

An upper surface (e.g., a surface opposite to the lower surface) of each magnet of the magnet unit 410 may be magnetized to have both an S pole and an N pole. For example, the upper surface of each magnet of the magnet unit 410 may sequentially have an S pole, a neutral region, and an N pole in a direction perpendicular to the optical axis (the Z-axis) direction.

The second coil unit 450 is disposed to face the magnet unit 410 in the illustrated embodiment. For example, the second coil unit 450 may be disposed to face the magnet unit 410 in the optical axis (the Z-axis) direction. The second coil unit 450 may be disposed in the housing 110. For example, the second coil unit 450 may be disposed on an inner bottom surface of the housing 110.

The second coil unit 450 may be disposed on one surface of a substrate 490, and the substrate 490 may be mounted on an inner bottom surface of the housing 110 such that the second coil unit 450 faces the magnet unit 410 in the optical axis (the Z-axis) direction.

The second coil unit 450 may include the number of coils corresponding to the number of magnets included in the magnet unit 410. Each coil of the second coil unit 450 may have a donut shape having a hollow, and each coil may be disposed to face each magnet of the magnet unit 410 in the optical axis (the Z-axis) direction.

In an example embodiment, two first coils 451 may be provided, and the two first coils 451 may be spaced apart from each other in the first axis (the X-axis) direction. Also, the two first coils 451 may be disposed to be parallel to each other. The first coil 451 has a length in the second axis (the Y-axis) direction.

In an example embodiment, two second coils 452 are provided, and the two second coils 452 may be spaced apart from each other in the second axis (the Y-axis) direction. Also, the two second coils 452 may be disposed to be parallel to each other. The second coil 452 has a length in the first axis (the X-axis) direction.

The first magnet 411 and the first coil 451 may face each other in the optical axis (the Z-axis) direction and generate driving force in the first axis (the X-axis) direction.

The second magnet 412 and the second coil 452 may face each other in the optical axis (the Z-axis) direction and generate driving force in the second axis (the Y-axis) direction.

During OIS, the magnet unit 410 is a moving member mounted in the carrier 300 and moving together with the carrier 300, and the second coil unit 450 is a fixed member fixed to the housing 110.

When power is applied to the second coil unit 450, the carrier 300 may be moved in a direction perpendicular to the optical axis (the Z-axis), by electromagnetic force between the magnet unit 410 and the second coil unit 450.

The magnet unit 410 and the second coil unit 450 may generate driving force in a direction perpendicular to the direction (the optical axis (the Z-axis) direction) in which the magnet unit 410 and the second coil unit 450 face each other.

In an example, the carrier 300 may be rotated by the magnet unit 410 and the second coil unit 450.

For example, rotational force may be generated by controlling the driving force of each magnet of the magnet unit 410 and each coil of the second coil unit 450 to thereby rotate the carrier 300.

Figure 4:
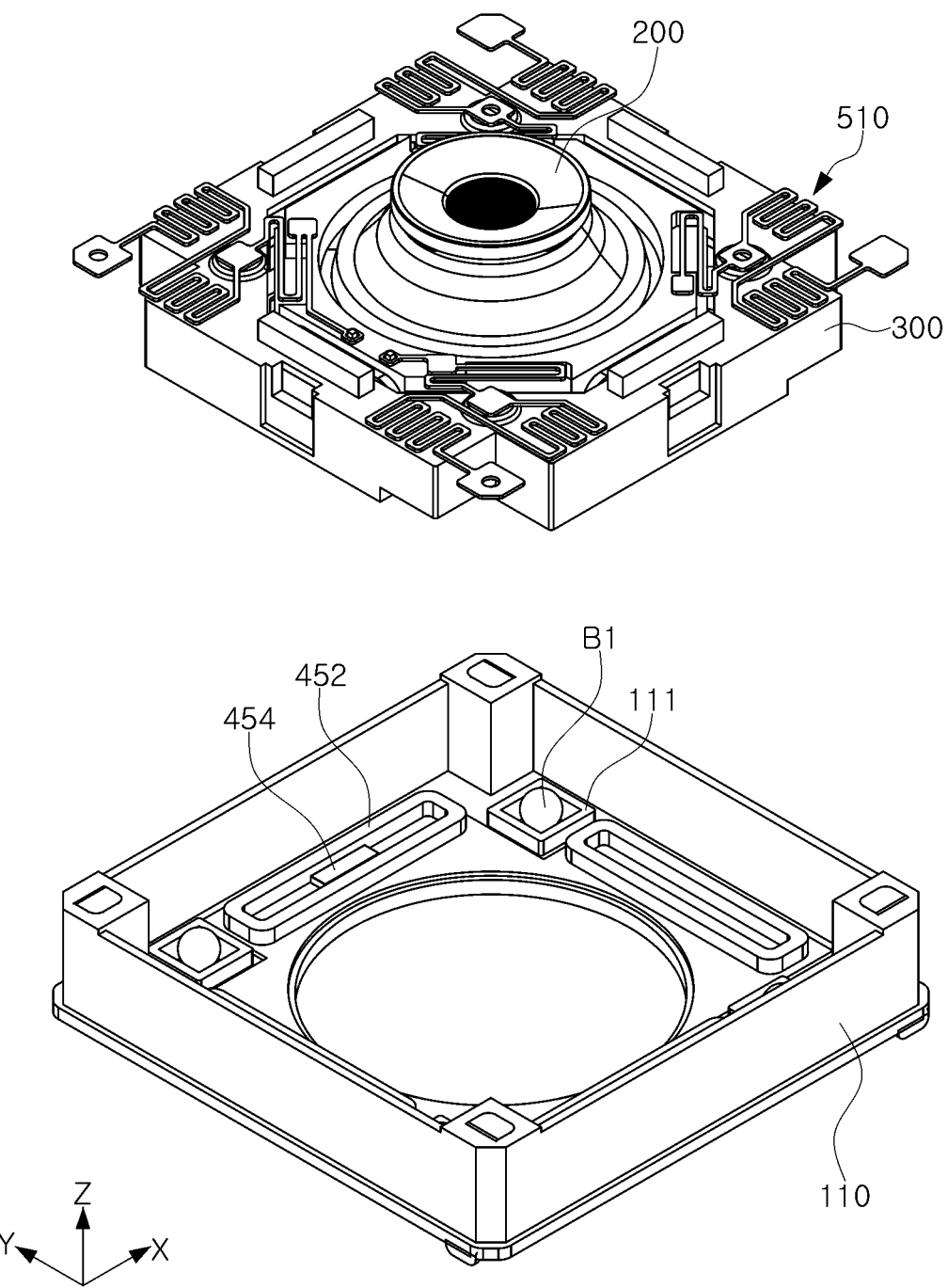
FIG. 4 is a perspective view illustrating a state in which a lens module and a carrier are separated from a housing in a camera module according to an example embodiment of the present disclosure.
Figure 5:
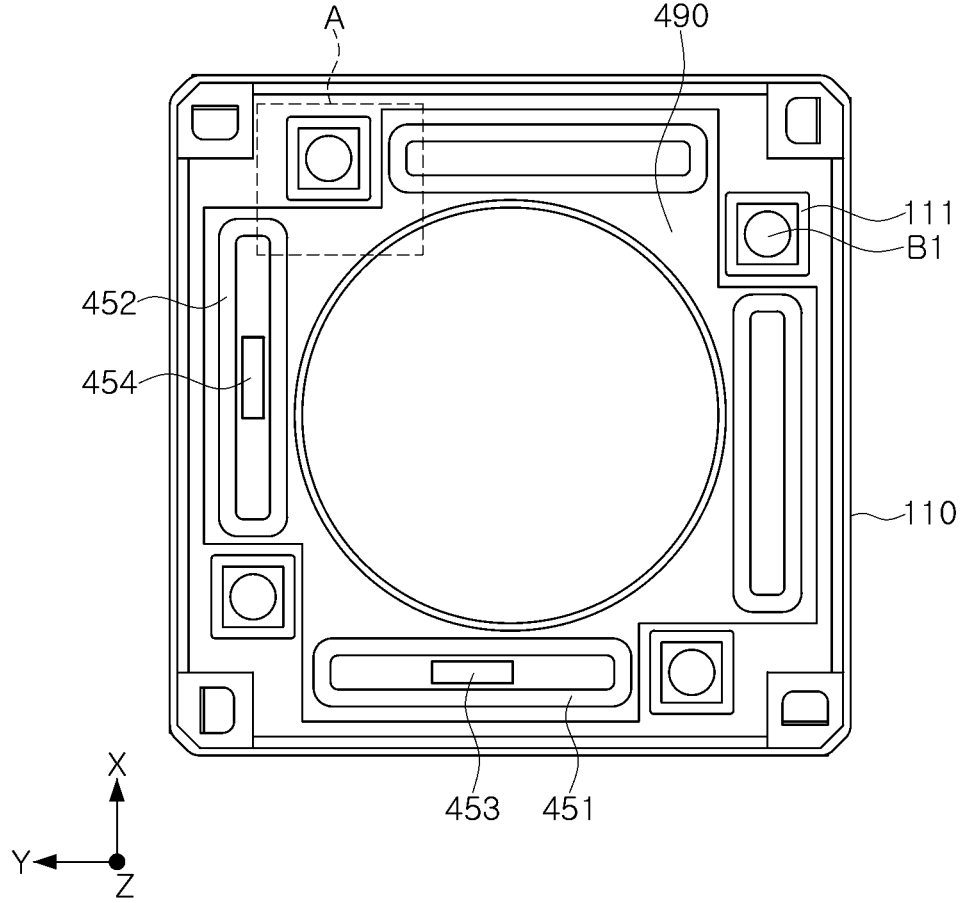
FIG. 5 is a plan view of a housing and a second coil unit according to an example embodiment of the present disclosure.
Figure 6:
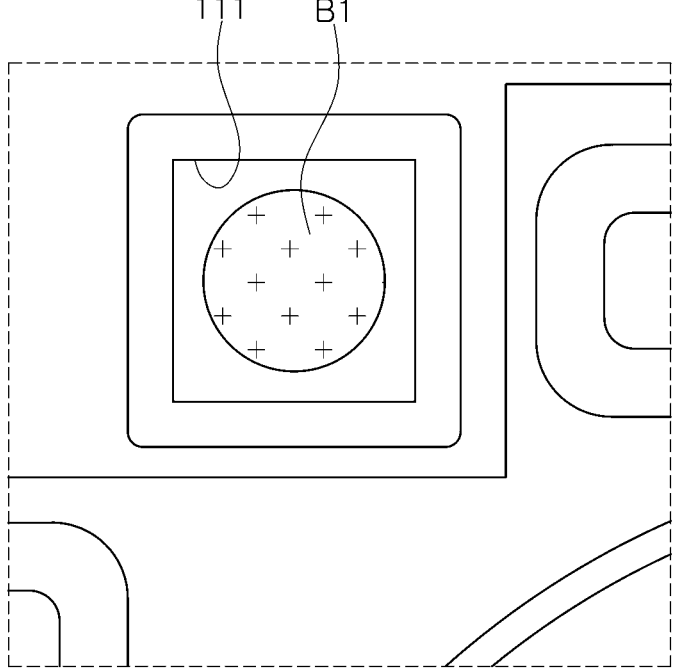
FIG. 6 is an enlarged view of portion A of FIG. 5.

FIG. 4 is a perspective view illustrating a state in which a lens module and a carrier are separated from a housing in a camera module according to an example embodiment of the present disclosure, and FIG. 5 is a plan view of a housing and a second coil unit according to an example embodiment of the present disclosure, and FIG. 6 is an enlarged view of portion A of FIG. 5.

Figure 7:
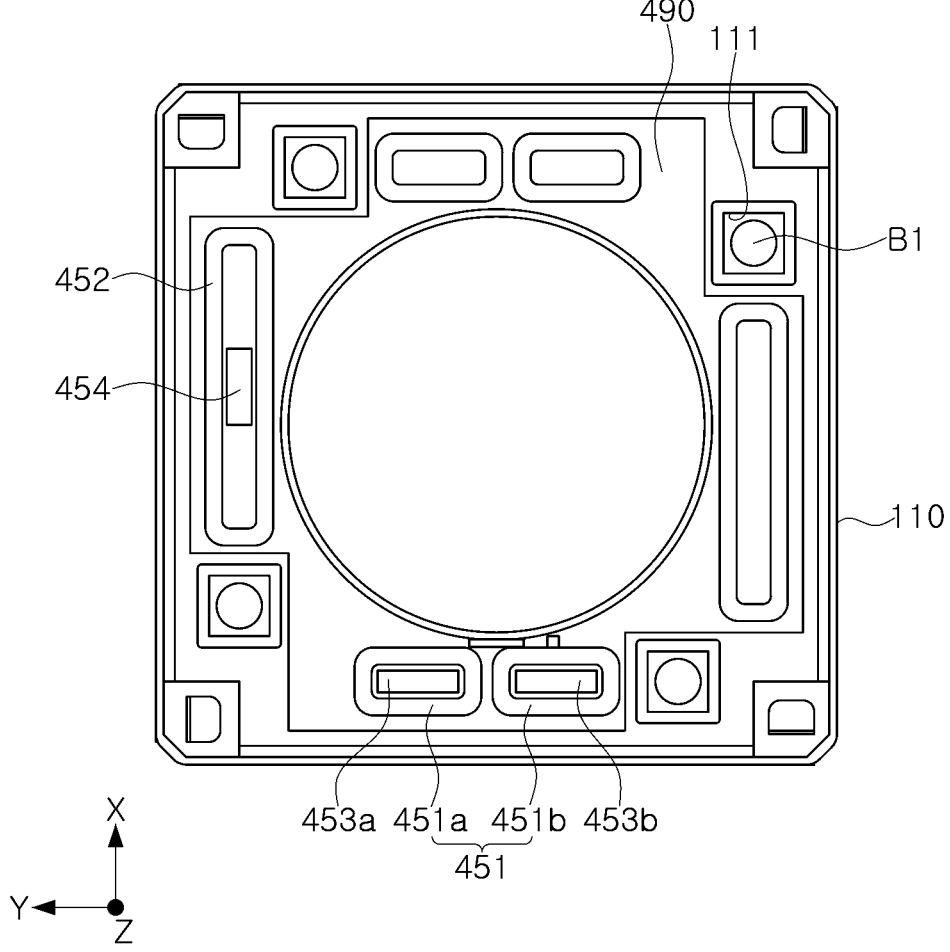
FIG. 7 is a first modified example of FIG. 5.
Figure 8:
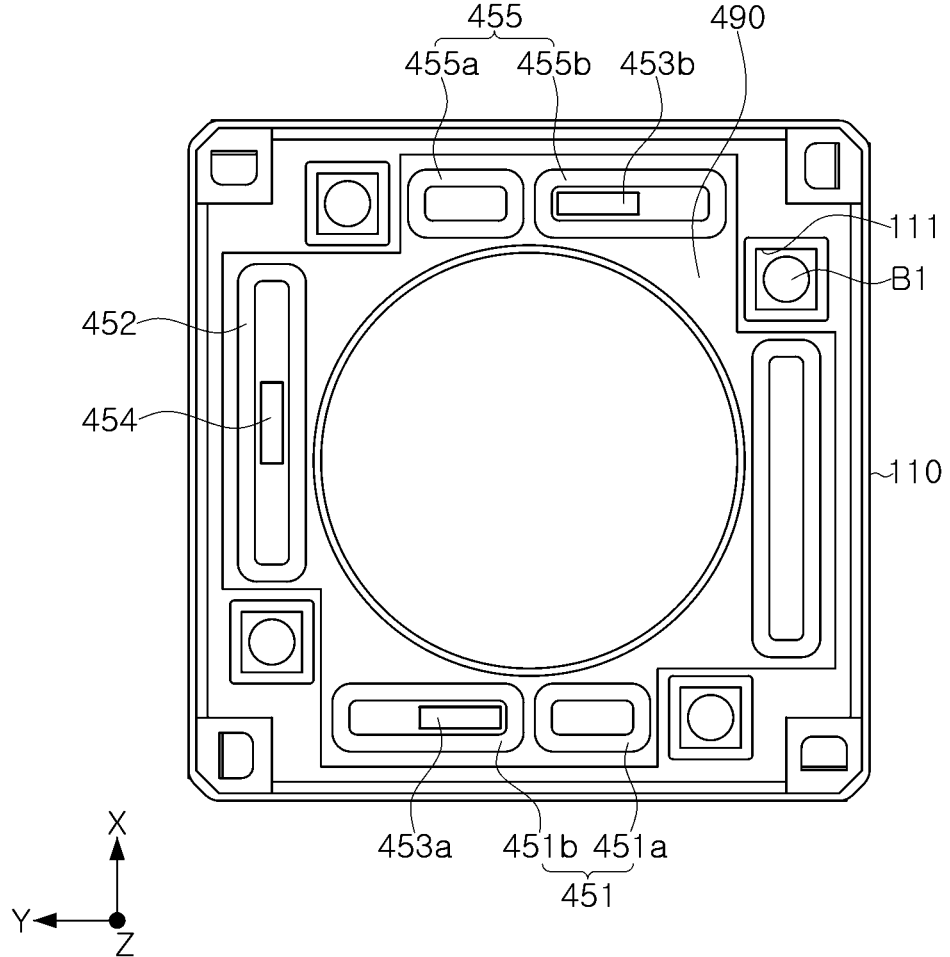
FIG. 8 is a second modified example of FIG. 5.

Also, FIG. 7 is a first modified example of FIG. 5, and FIG. 8 is a second modified example of FIG. 5.

Referring to FIGS. 4 to 6, the ball member B1 is disposed between the carrier 300 and the housing 110. For example, the ball member B1 is disposed between the lower surface of the carrier 300 and the inner bottom surface of the housing 110 facing each other in the optical axis (the Z-axis) direction.

The ball member B1 may be disposed to contact each of the carrier 300 and the housing 110.

A yoke member 480 may be disposed in the housing 110 (refer to FIG. 2). The yoke member 480 may be disposed in a position facing each magnet of the magnet unit 410. For example, the second coil unit 450 may be disposed on one surface of the substrate 490 and the yoke member 480 may be disposed on the other surface of the substrate 490.

Each magnet of the magnet unit 410 and the yoke member 480 may generate attractive force between each other. For example, attractive force acts in the optical axis (the Z-axis) direction between each magnet of the magnet unit 410 and the yoke member 480. The yoke member 480 may be a magnetic material.

The ball member B1 may contact each of the carrier 300 and the housing 110 by attractive force between each magnet of the magnet unit 410 and the yoke member 480.

The ball member B1 functions to guide the movement of the carrier 300 during the OIS process. In addition, the ball member B1 also functions to maintain a distance between the carrier 300 and the housing 110.

The ball member B1 includes a plurality of balls disposed between the carrier 300 and the housing 110. In an example embodiment, the ball member B1 may include three or more balls.

When the ball member B1 includes four or more balls, a diameter of any one of the four balls may be smaller than those of the other three balls. When all four balls have the same diameter, a depth of a guide recess in which any one of the four balls is placed in the optical axis (the Z-axis) direction may be deeper than a depth of guide recesses in which the other three balls are disposed in the optical axis (the Z-axis) direction.

The yoke member 480 may be disposed in the housing 110 to form a three-point support structure of the carrier 300 by the ball member B1. When the ball member B1 includes four or more balls, the yoke member 480 may generate a biased attractive force between the yoke member 480 and the magnet unit 410 so that the three balls come into contact with the carrier 300.

The ball member B1 rolls in the first axis (the X-axis) direction when driving force is generated in the first axis (the X-axis) direction. Accordingly, the ball member B1 guides the movement of the carrier 300 in the first axis (the X-axis) direction. That is, when driving force is generated in the first axis (the X-axis) direction, the carrier 300 is moved in the first axis (the X-axis) direction.

In addition, the ball member B1 rolls in the second axis (the Y-axis) direction when driving force is generated in the second axis (the Y-axis) direction. Accordingly, the ball member B1 guides the movement of the carrier 300 in the second axis (the Y-axis) direction. That is, when driving force is generated in the second axis (the Y-axis) direction, the carrier 300 is moved in the second axis (the Y-axis) direction.

In an example, the carrier 300 may be rotated by generating a deviation between a magnitude of the driving force in the first axis (the X-axis) direction and a magnitude of the driving force in the second axis (the Y-axis) direction.

Since the lens module 200 is accommodated in the carrier 300, the lens module 200 may also be moved or rotated as the carrier 300 moves.

At least one of the surfaces in which the carrier 300 and the housing 110 face each other in the optical axis (the Z-axis) direction is provided with a guide recess in which the ball member B1 is disposed. A plurality of guide recesses are provided to correspond to the plurality of balls of the ball member B1.

For example, a first guide recess 111 may be provided on the inner bottom surface of the housing 110, and a second guide recess 310 (FIG. 10) may be provided on the lower surface of the carrier 300.

The ball member B1 may be disposed in the first guide recess 111 and the second guide recess 310 and may be inserted between the carrier 300 and the housing 110.

Therefore, the ball member B1 may roll in a direction perpendicular to the optical axis (the Z-axis), in a state of being accommodated in the first guide recess 111 and the second guide recess 310.

In an example, the carrier 300 and the housing 110 may each have a support pad, and at least a portion of the support pad may form a bottom surface of the first guide recess 111 and a bottom surface of the second guide recess 310. Thus, the ball member B1 may roll in contact with the support pad.

The support pad may be integrally coupled to the carrier 300 and the housing 110 by insert injection. In this case, the support pad may be manufactured to be integrated with the carrier 300 and the housing 110 by injecting a resin material into a mold while the support pad is fixed in the mold.

The support pad may be formed of a non-magnetic metal (e.g., stainless steel) material.

Each of the first guide recess 111 and the second guide recess 310 may have a rectangular planar shape.

A size of the first guide recess 111 and the second guide recess 310 is greater than a diameter of the ball member B1. For example, the size of the first guide recess 111 and the second guide recess 310 on a plane perpendicular to the optical axis (the Z-axis), may be greater than the diameter of the ball member B1.

Each of the first guide recess 111 and the second guide recess 310 may have a square planar shape.

That is, as illustrated in FIG. 6, a distance between the center of each guide recess and the edge of each guide recess may be greater than a distance between the center of each guide recess and one side wall of each guide recess.

Therefore, since the amount of movement of the ball member in a diagonal direction of each guide recess is maximized, OIS performance in the diagonal direction may be improved, compared to a case in which each guide recess has a circular shape.

The camera module may detect a position of the lens module 200 in the optical axis (the Z-axis) direction.

To this end, a first position sensor unit 431 may be provided. The first position sensor unit 431 may be disposed in the lens module 200 to face the magnet unit 410 (refer to FIG. 2). The first position sensor unit 431 may face the magnet unit 410 in a direction perpendicular to the optical axis (the Z-axis). The first position sensor unit 431 may include at least one Hall sensor.

In addition, the camera module may detect a position in a direction perpendicular to the optical axis (the Z-axis) of the carrier 300.

To this end, a second position sensor unit 453 and a third position sensor unit 454 may be provided. The second position sensor unit 453 and the third position sensor unit 454 may be disposed in the housing 110 to face the magnet unit 410. For example, the second position sensor unit 453 and the third position sensor unit 454 may be disposed on one surface of the substrate 490, and the substrate 490 may be mounted in the housing 110. Each of the second position sensor unit 453 and the third position sensor unit 454 may include at least one Hall sensor.

The second position sensor unit 453 may face one of the plurality of magnets of the magnet unit 410 in the optical axis (the Z-axis) direction. Also, the third position sensor unit 454 may face another one of the plurality of magnets of the magnet unit 410 in the optical axis (the Z-axis) direction.

The magnet facing the second position sensor unit 453 and the magnet facing the third position sensor unit 454 may be disposed to be perpendicular to each other on a plane perpendicular to the optical axis (the Z-axis).

For example, the first magnet 411 and the second position sensor unit 453 may be disposed to face each other in the optical axis (the Z-axis) direction, the second magnet 412 and the third position sensor unit 454 may be disposed to face each other in the optical axis (the Z-axis) direction, and the first magnet 411 and the second magnet 412 may be disposed to be perpendicular to each other on a plane perpendicular to the optical axis (the Z-axis).

In an example embodiment, any one of the second position sensor unit 453 and the third position sensor unit 454 may include two Hall sensors. The two Hall sensors may be disposed to face one magnet.

For example, referring to FIG. 7, one of a plurality of magnets included in the magnet unit 410 and the two Hall sensors may face each other. In an example embodiment, the second position sensor unit 453 may include a first Hall sensor 453a and a second Hall sensor 453b facing the first magnet 411 in the optical axis (the Z-axis) direction.

In the example embodiment of FIG. 7, at least one of the two first coils 451 may be provided as two coils 451a and 451b. The two coils 451a and 451b may be spaced apart from each other in the second axis (the Y-axis) direction and may face the first magnet 411 in the optical axis (the Z-axis) direction.

That is, in the example embodiment of FIG. 7, the number of a plurality of coils of the second coil unit 450 is greater than the number of a plurality of magnets included in the magnet unit 410. The first Hall sensor 453a may be disposed inside any one of the two coils 451a, 451b and the second Hall sensor 453b may be disposed inside the other one of the two coils 451a, 451b.

Through the first Hall sensor 453a and the second Hall sensor 453b, whether the carrier 300 is rotated may be detected. Accordingly, the carrier 300 may be intentionally rotated by controlling driving force of the driving unit 400, or the rotational force applied to the carrier 300 may be offset when rotation is not required.

In an example embodiment, any of the second position sensor unit 453 and the third position sensor unit 454 may include two Hall sensors. The two Hall sensors may be disposed to face different magnets, respectively. The magnets respectively facing the Hall sensors may be disposed to be parallel to each other. Also, the magnets respectively facing the Hall sensors may face the two coils, respectively.

In the example embodiment illustrated in FIG. 8, one of the two first coils 451 facing the first magnet 411 in the optical axis (the Z-axis) direction and spaced apart from each other in the first axis (the X-axis) direction is referred to by reference numeral 451 and the other is referred to by reference numeral 455.

The first coil 451 includes two coils 451a and 451b, and the two coils 451a and 451b may have different lengths in the second axis (the Y-axis) direction.

For example, based on an imaginary line extending in the first axis (the X-axis) direction, while passing through the optical axis (the Z-axis), one coil 451a may be disposed in a −Y direction and one coil 451b may be disposed in a +Y direction. One coil 451b disposed in the +Y direction may be longer in the second axis (the Y-axis) direction than one coil 451a disposed in the −Y direction.

The first coil 455 includes two coils 455a and 455b, and the two coils 455a and 455b may have different lengths in the second axis (the Y-axis) direction.

For example, based on an imaginary line extending in the first axis (the X-axis) direction, while passing through the optical axis (the Z-axis), one coil 455b may be disposed in the −Y direction and one coil 455a may be disposed in the +Y direction. One coil 455b disposed in the −Y direction may be longer in the second axis (the Y-axis) direction than one coil 455a disposed in the +Y direction.

The second position sensor unit 453 may include a first Hall sensor 453a and a second Hall sensor 453b. The first Hall sensor 453a and the second Hall sensor 453b may be spaced apart from each other in the first axis (the X-axis) direction. The first Hall sensor 453a may be disposed to face one of the two first magnets 411 in the optical axis (the Z-axis) direction, and the second Hall sensor 453b may be disposed to face the other of the two first magnets 411 in the optical axis (the Z-axis) direction.

The first Hall sensor 453a may be disposed inside one coil 451b among the two coils of the first coil 451. Also, the second Hall sensor 453b may be disposed inside one coil 455b among the two coils of the first coil 455.

The first Hall sensor 453a and the second Hall sensor 453b may be disposed to be spaced apart from an imaginary line extending in the first axis (the X-axis) direction, while passing through the optical axis (the Z-axis). For example, the first Hall sensor 453a may be spaced apart from the imaginary line extending in the first axis (the X-axis) direction, while passing through the optical axis (the Z-axis), in the positive direction of the second axis (the Y-axis). Also, the second Hall sensor 453b may be spaced apart from the imaginary line extending in the first axis (the X-axis) direction, while passing through the optical axis (the Z-axis), in the negative direction of the second axis (the Y-axis).

A distance from the imaginary line extending in the first axis (the X-axis) direction, while passing through the optical axis (the Z-axis), and a distance from a virtual line extending in the first axis (the X-axis) direction, while passing through the optical axis (the Z-axis), may be the same.

Through the first Hall sensor 453a and the second Hall sensor 453b, whether the carrier 300 is rotated may be detected. Accordingly, the carrier 300 may be intentionally rotated by controlling driving force of the driving unit 400, or rotational force applied to the carrier 300 may be offset when rotation is not required.

Figure 9:
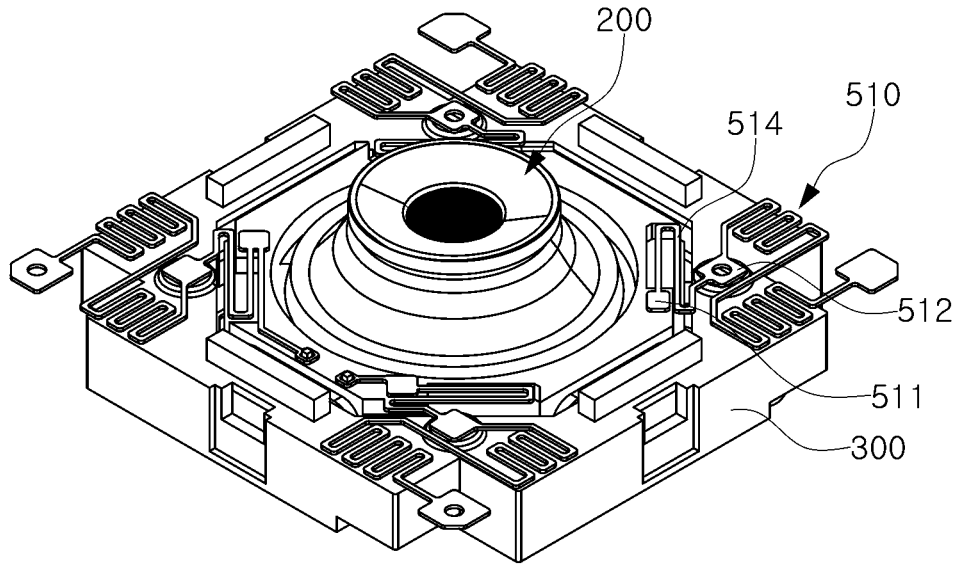
FIG. 9 is an assembled perspective view of a lens module and a carrier.
Figure 10:
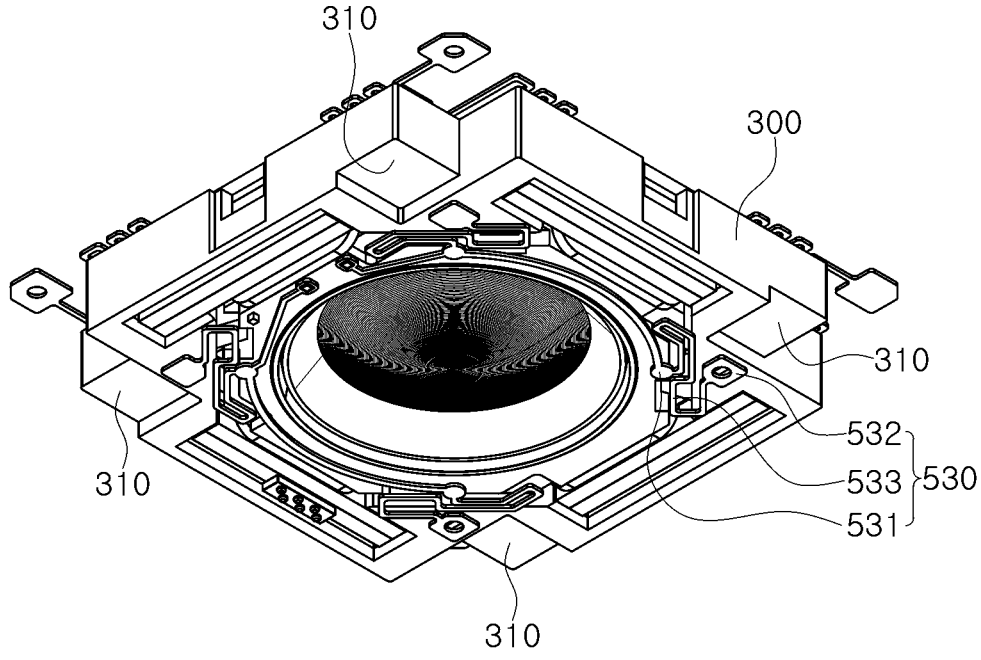
FIG. 10 is a bottom perspective view of FIG. 9.
Figure 11:
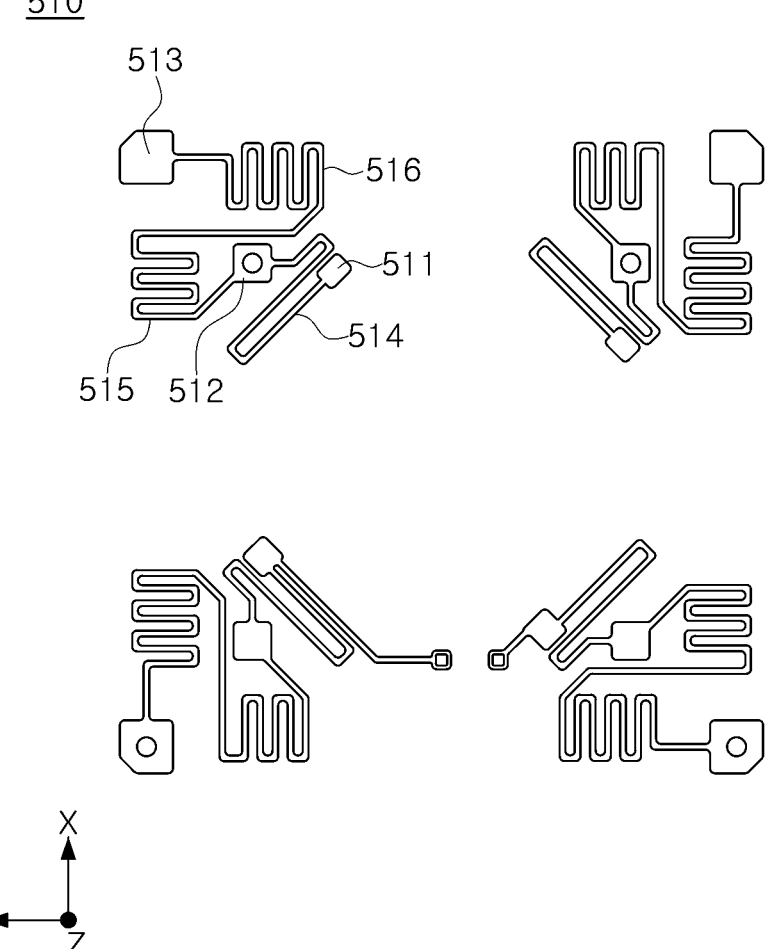
FIG. 11 is a plan view of a first elastic member.

FIG. 9 is an assembled perspective view of a lens module and a carrier, FIG. 10 is a bottom perspective view of FIG. 9, and FIG. 11 is a plan view of a first elastic member.

Referring to FIGS. 9 and 10, the lens module 200 is accommodated in the carrier 300. Also, the lens module 200 may be supported by the first elastic member 510 and the second elastic member 530 to be movable in the optical axis (the Z-axis) direction.

The first elastic member 510 includes a first coupling portion 511 connected to an upper surface of the lens module 200 and a second coupling portion 512 connected to an upper surface of the carrier 300. In addition, the first elastic member 510 includes a first support portion 514 connecting the first coupling portion 511 to the second coupling portion 512.

The second elastic member 530 includes a first fixed portion 531 connected to the lower surface of the lens module 200 and a second fixed portion 532 connected to the lower surface of the carrier 300. In addition, the second elastic member 530 includes a second support portion 533 connecting the first fixed portion 531 to the second fixed portion 532.

The lens module 200 may be accommodated in the carrier 300 and elastically supported by the first elastic member 510 and the second elastic member 530. When the lens module 200 is moved in the optical axis (the Z-axis) direction, at least a portion of the first elastic member 510 and at least a portion of the second elastic member 530 may be elastically deformed.

For example, when the lens module 200 is moved in the optical axis (the Z-axis) direction, the first support portion 514 of the first elastic member 510 and the second support portion 533 of the second elastic member 530 may be elastically deformed to elastically support the lens module 200.

Each of the first elastic member 510 and the second elastic member 530 may be a conductor. Also, each of the first elastic member 510 and the second elastic member 530 may be a leaf spring.

Referring to FIG. 11, the first elastic member 510 includes the first coupling portion 511 connected to the upper surface of the lens module 200, the second coupling portion 512 connected to the upper surface of the carrier 300, and the first support portion 514 connecting the first coupling portion 511 to the second coupling portion 512. In addition, the first elastic member 510 further includes a third coupling portion 513 connected to the housing 110 and a first bent portion 515 and a second bent portion 516 connecting the second coupling portion 512 to the third coupling portion 513.

That is, the first elastic member 510 is coupled to the lens module 200 and the carrier 300 to elastically support the lens module 200 with respect to the carrier 300, and is also coupled to the housing 110 to serve to elastically support the carrier 300 with respect to the housing 110.

The first bent portion 515 and the second bent portion 516 may be formed to be bent multiple times in the first axis (the X-axis) direction and the second axis (the Y-axis) direction. A direction in which the first bent portion 515 is bent and a direction in which the second bent portion 516 is bent may be different from each other.

The first bent portion 515 may be connected to the second coupling portion 512, the second bent portion 516 may be connected to the third coupling portion 513, and the first bent portion 515 and the second bent portion 516 may be connected to each other.

Accordingly, when the carrier 300 is moved in a direction perpendicular to the optical axis (the Z-axis), the first bent portion 515 and the second bent portion 516 may be elastically deformed to elastically support the carrier 300.

In an example, referring to FIG. 2, an accommodation recess 233 may be disposed in the lens module 200. For example, the accommodation recess 233 may be formed on a side surface of the lens holder 230. In addition, a protrusion 350 disposed in the accommodation recess 233 may be provided on an internal surface of the carrier 300.

The inner upper surface of the accommodation recess 233 and the upper surface of the protrusion 350 may face each other in the optical axis (the Z-axis) direction. Therefore, when the lens module 200 is moved downwardly in the optical axis (the Z-axis) direction, the accommodation recess 233 and the protrusion 350 may serve as a stopper regulating a downward movement range of the lens module 200 in the optical axis (the Z-axis) direction and may also serve to buffer an impact when the lens module 200 and the carrier 300 collide with each other.

Figure 12:
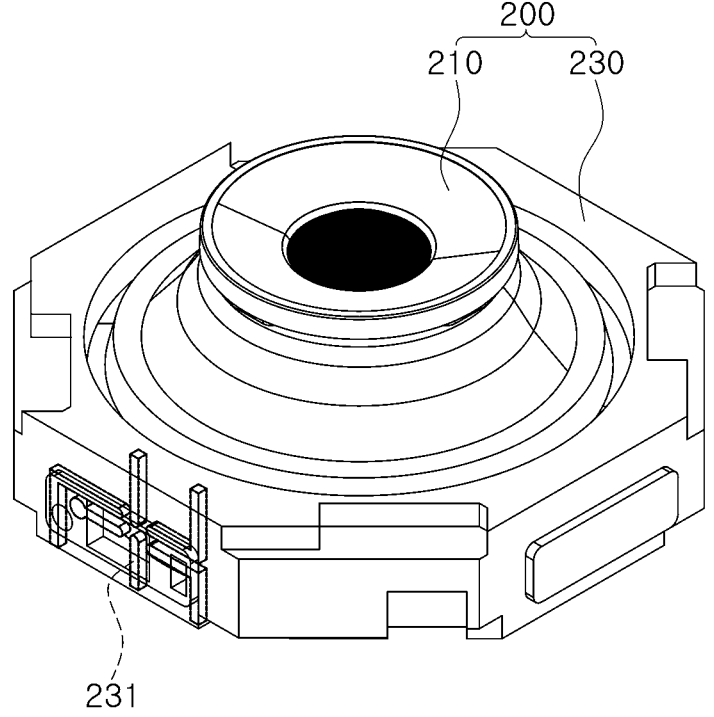
FIG. 12 is a perspective view of a lens module according to an example embodiment of the present disclosure.
Figure 13:
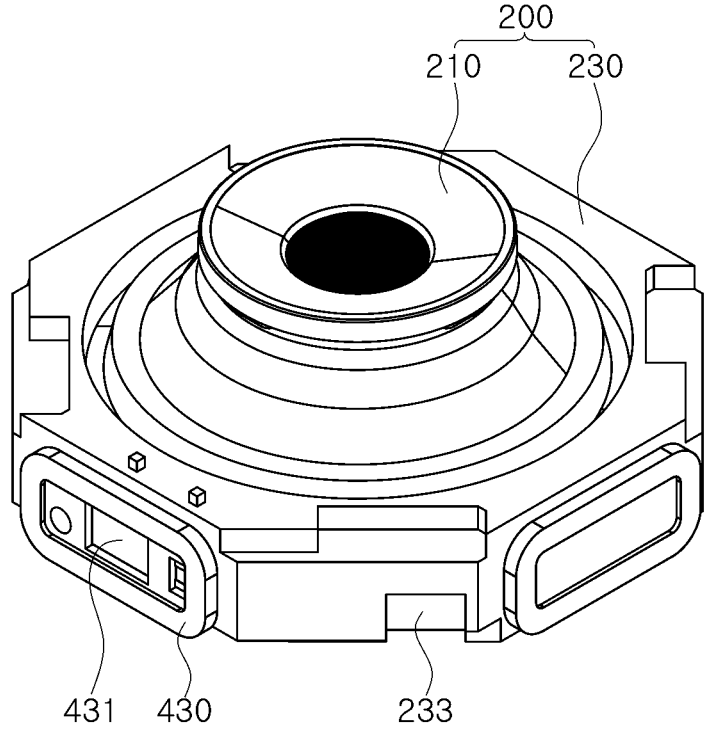
FIG. 13 is a perspective view illustrating a state in which a first coil unit is coupled to a lens module.

FIG. 12 is a perspective view of a lens module according to an example embodiment of the present disclosure, and FIG. 13 is a perspective view illustrating a state in which a first coil unit is coupled to a lens module.

Figure 14:
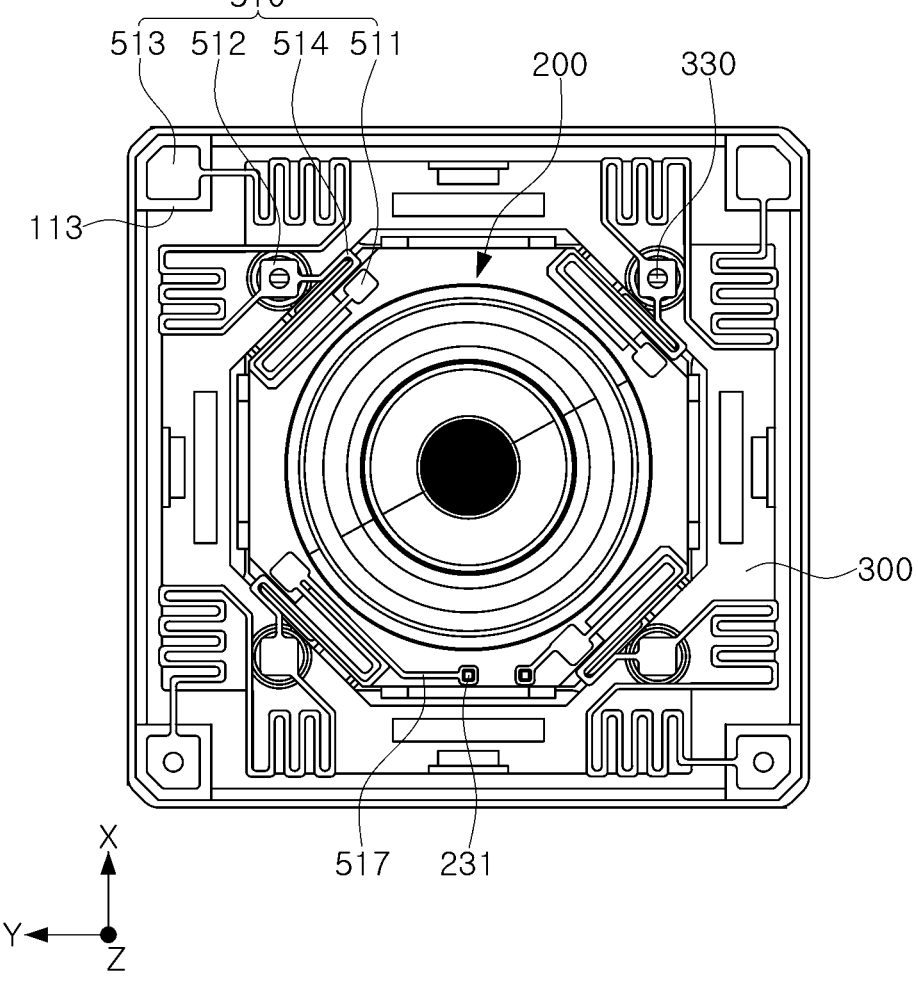
FIG. 14 is a plan view illustrating a state in which a case is removed from a camera module according to an example embodiment of the present disclosure.
Figure 15:
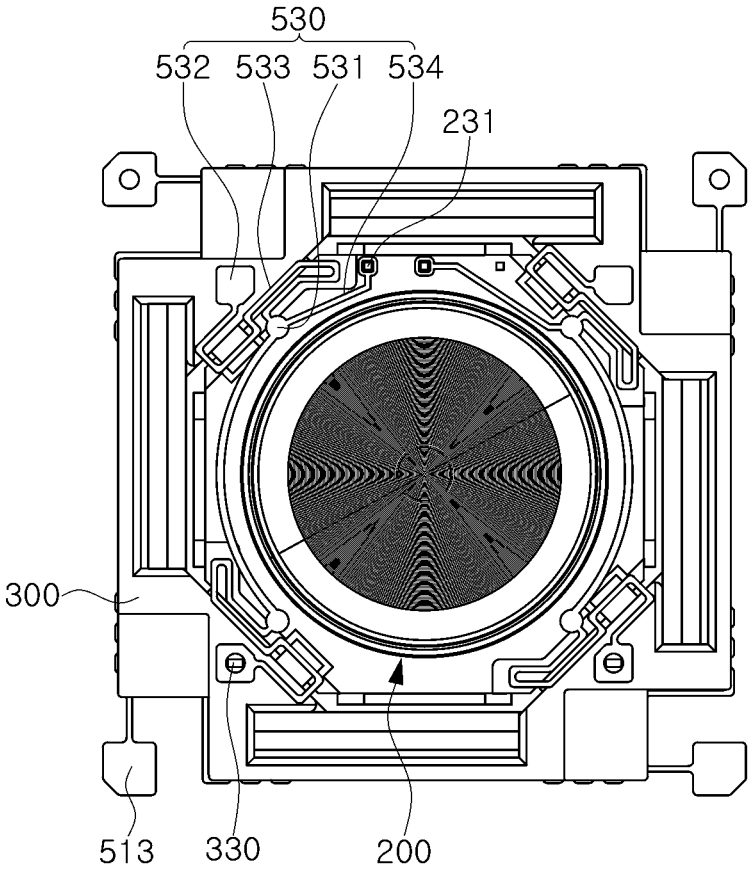
FIG. 15 is a bottom view illustrating a state in which a lens module, a carrier, a first elastic member, and a second elastic member are coupled.

FIG. 14 is a plan view illustrating in which a case is removed from a camera module according to an example embodiment of the present disclosure, and FIG. 15 is a bottom view illustrating a state in which a lens module, a carrier, a first elastic member, and a second elastic member are coupled to each other.

Figure 16:
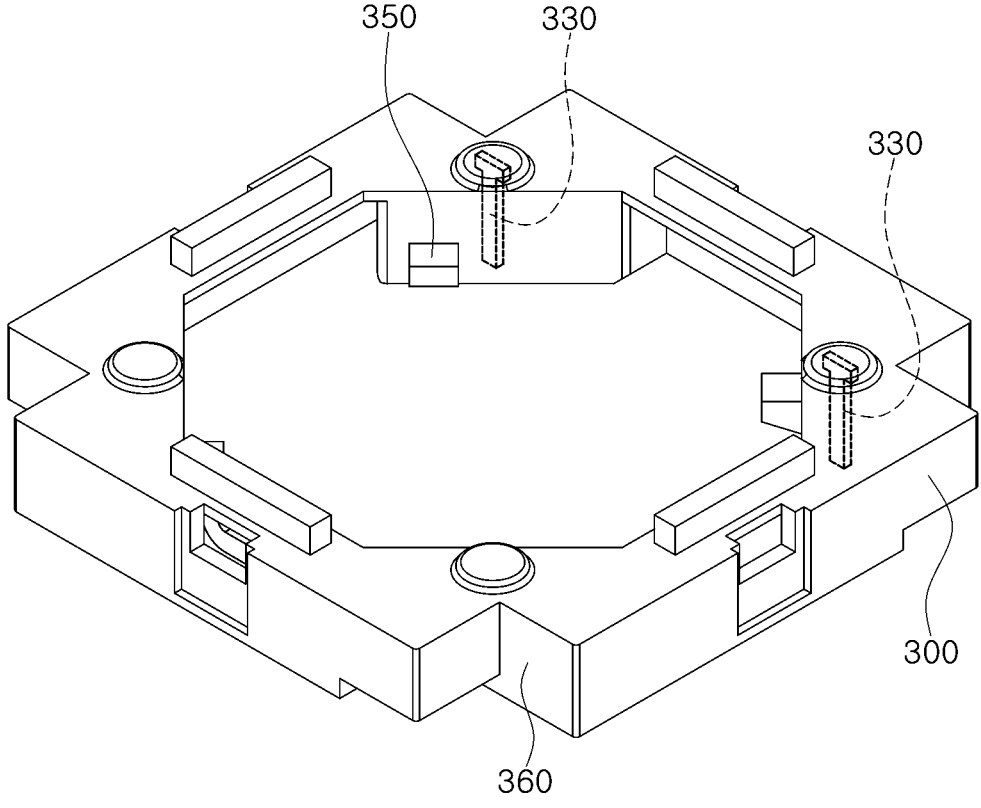
FIG. 16 is a perspective view of a carrier according to an example embodiment of the present disclosure.
Figure 17:
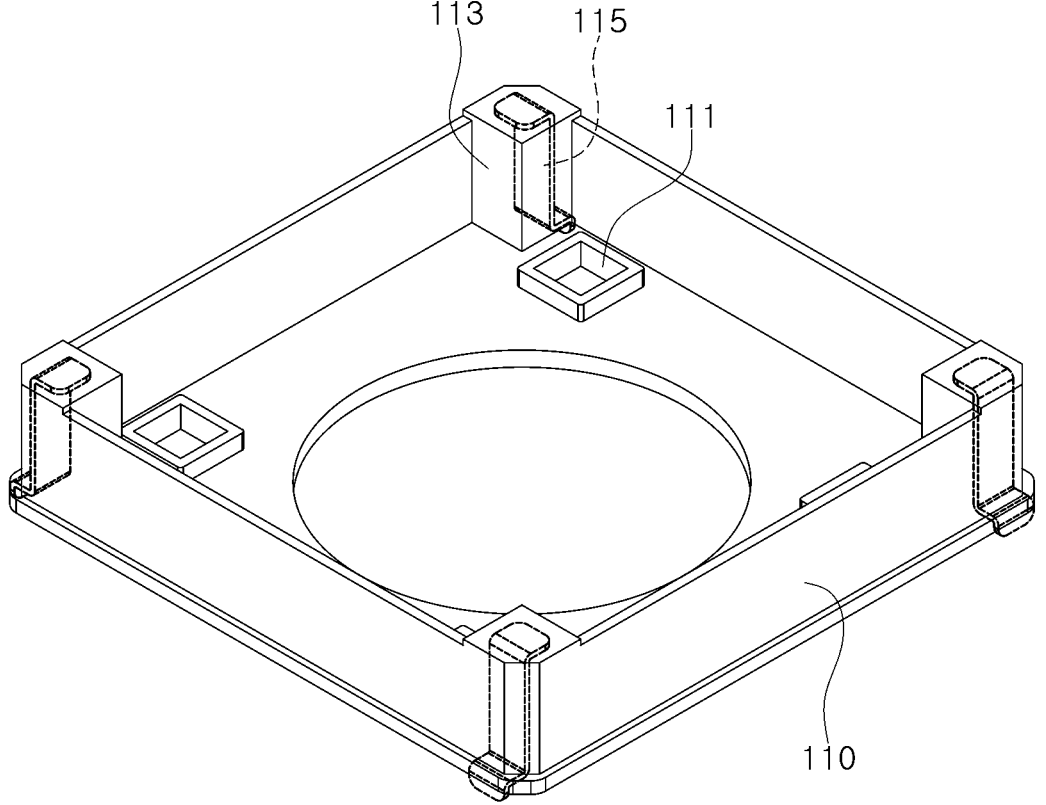
FIG. 17 is a perspective view of a housing according to an example embodiment of the present disclosure.

Also, FIG. 16 is a perspective view of a carrier according to an example embodiment of the present disclosure, and FIG. 17 is a perspective view of a housing according to an example embodiment of the present disclosure.

A process of transmitting a driving signal to the first coil unit 430 will be described with reference to FIGS. 12 to 17.

The first coil unit 430 may be disposed in the lens module 200, and a wiring pattern 231 may be disposed inside the lens module 200. The wiring pattern 231 may be connected to the first coil unit 430. For example, the wiring pattern 231 may be disposed inside the lens holder 230, the first coil unit 430 may be disposed on a side surface of the lens holder 230, and the wiring pattern 231 and the first coil unit 430 may be electrically connected to each other.

The wiring pattern 231 may also be connected to the first elastic member 510 and the second elastic member 530. Also, the first elastic member 510 may be connected to the housing 110.

One end of the wiring pattern 231 may be exposed to an upper portion of the lens holder 230 and the other end of the wiring pattern 231 may be exposed to a lower portion of the lens holder 230.

One end of the wiring pattern 231 exposed to the upper portion of the lens holder 230 may be connected to the first elastic member 510. For example, referring to FIG. 14, the first elastic member 510 further includes a first connection portion 517 connecting the first coupling portion 511 to one end of the wiring pattern 231.

The first elastic member 510 further includes a third coupling portion 513 connected to the housing 110. A column portion 113 extending in the optical axis (the Z-axis) direction may be disposed at a corner region of the housing 110, and a first signal pattern 115 extending in the optical axis (the Z-axis) direction may be disposed inside the column portion 113. The third coupling portion 513 of the first elastic member 510 may be connected to the first signal pattern 115 of the column portion 113. The first signal pattern 115 may be a conductor.

Also, the first signal pattern 115 may be connected to a printed circuit board (PCB) on which an image sensor is disposed.

The other end of the wiring pattern 231 exposed to the lower portion of the lens holder 230 may be connected to the second elastic member 530. For example, referring to FIG. 15, the second elastic member 530 further includes a second connection portion 534 connecting the first fixed portion 531 to the other end of the wiring pattern 231.

Referring to FIG. 16, a second signal pattern 330 extending in the optical axis (the Z-axis) direction may be disposed inside the carrier 300, and the second fixed portion 532 of the second elastic member 530 may be connected to the second signal pattern 330 of the carrier 300.

Also, the second signal pattern 330 may be connected to the second coupling portion 512 of the first elastic member 510. The second signal pattern 330 may be a conductor.

Accordingly, the first coil unit 430 may be provided with power through the first signal pattern 115 disposed in the housing 110, the first elastic member 510 connecting the housing 110 to the lens module 200, the wiring pattern 231 disposed in the lens module 200, and the second elastic member 530 connecting the carrier 300 to the lens module 200.

That is, in the camera module according to an example embodiment of the present disclosure, power may be supplied to the driving unit 400 by disposing the wiring pattern 231 in the lens module 200 itself and connecting the first elastic member 510 and the second elastic member 530 to the wiring pattern 231, rather than having a separate PCB for supplying power to the driving unit 400 disposed in the lens module 200.

The wiring pattern 231 may be integrally coupled to the lens module 200 by insert injection. For example, the wiring pattern 231 may be manufactured to be integrated with the lens holder 230 by injecting a resin material into a mold in a state in which the wiring pattern 231 is disposed in the mold.

The first signal pattern 115 may be integrally coupled to the housing 110 by insert injection. For example, the first signal pattern 115 may be manufactured to be integrated with the housing 110 by injecting a resin material into the mold while the first signal pattern 115 is disposed in the mold.

In another example embodiment, the first signal pattern 115 may be in the form of a copper foil pattern attached to a surface of the column portion 113.

The second signal pattern 330 may be integrally coupled to the carrier 300 by insert injection. For example, the second signal pattern 330 may be manufactured to be integrated with the carrier 300 by injecting a resin material into a mold while the second signal pattern 330 is disposed in the mold.

A driving IC applying a driving signal to the first coil unit 430 may be integrally formed with the first position sensor unit 431, and the first position sensor unit 431 may be connected to the wiring pattern 231.

In an example, referring to FIG. 2, the column portion 113 in which the first signal pattern 115 is disposed may be disposed at each corner region of the housing 110. That is, four column portions 113 may be provided.

In addition, an avoidance portion 360 may be disposed at each corner region of the carrier 300 accommodated in the housing 110. The avoidance portion 360 may pass through the corner region of the carrier 300 in the optical axis (the Z-axis) direction. In a state in which the carrier 300 is accommodated in the housing 110, the column portion 113 may be spaced apart from the avoidance portion 360 in a direction perpendicular to the optical axis (the Z-axis). That is, a side surface of the carrier 300 may not contact the column portion 113.

Although it has been described that the column portion 113 is formed in the corner region of the housing 110 and the avoidance portion 360 is formed in the corner region of the carrier 300, the position of the column portion 113 is not limited to the corner region of the housing 110 and the carrier 300 as long as the column portion 113 is accommodated in the avoidance portion 360.

Figure 18:
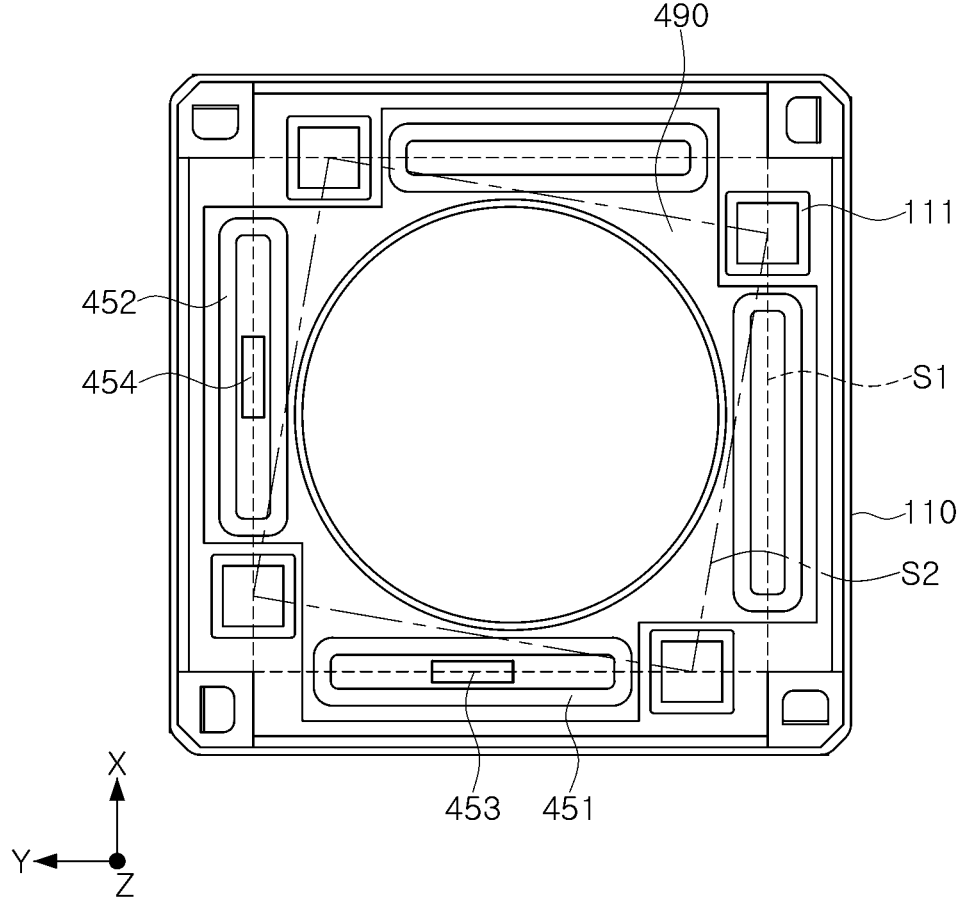
FIG. 18 is a view illustrating an arrangement relationship between guide recesses and coils.

FIG. 18 is a view illustrating an arrangement relationship between guide recesses and coils.

Referring to FIG. 18, the first guide recess 111 formed in the housing 110 may be disposed to be adjacent to the column portion 113. For example, the first guide recess 111 may be spaced apart from the column portion 113 in a direction perpendicular to the optical axis (the Z-axis).

Also, the first guide recess 111 may be disposed between the column portion 113 and the second coil unit 450.

The second coil unit 450 may include two first coils 451 and two second coils 452, and the two first coils 451 may be spaced apart from each other in the first axis (the X-axis) direction and the two second coils 452 may be spaced apart from each other in the second axis (the Y-axis) direction.

The centers of the two first coils 451 may be alternately disposed. Also, the centers of the two second coils 452 may be alternately disposed.

When a figure in which lines extending in a longitudinal direction of the two first coils 451 and the two second coils 452 from the centers of the respective coils meet each other is referred to as a first figure S1 and a figure formed by connecting the centers of the plurality of first guide recesses 111 is referred to as a second figure S2, an area of the first figure S1 is larger than that of the second figure S2.

The second figure S2 may be inclined with respect to the first figure S1. In addition, each corner of the second figure S2 may be inscribed with the first figure S1 or spaced apart from each other inwardly of each side of the first figure S1.

Figure 19:
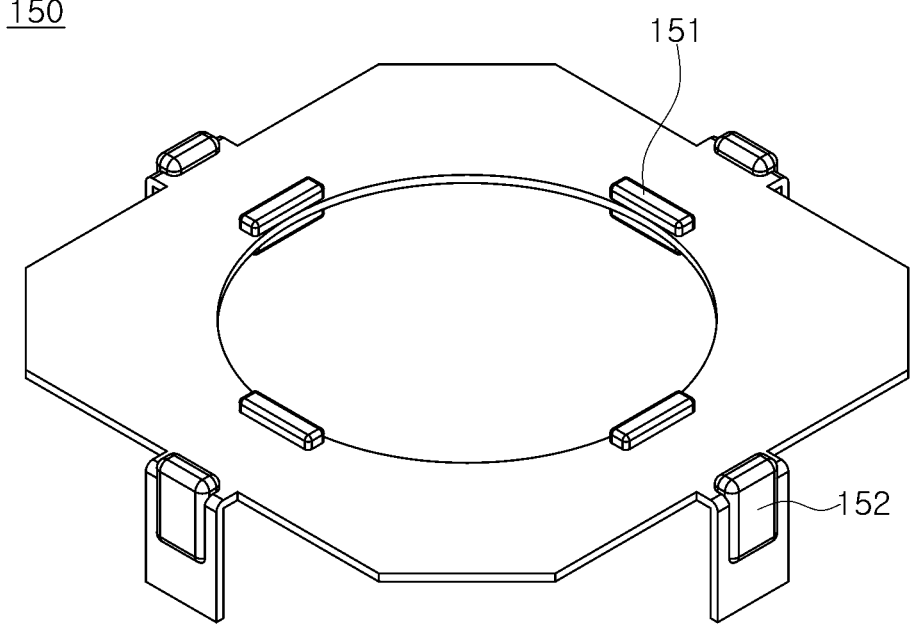
FIG. 19 is a perspective view of a cover of a camera module according to an example embodiment of the present disclosure.
Figure 20:
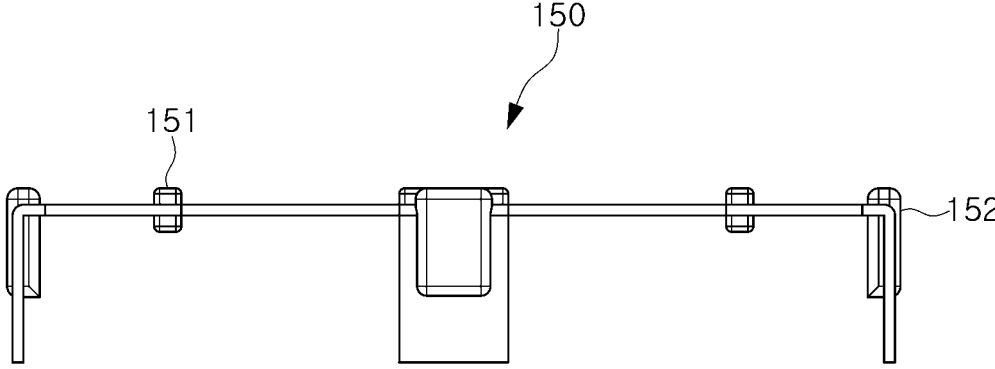
FIG. 20 is a side view of a cover of a camera module according to an example embodiment of the present disclosure.

FIG. 19 is a perspective view of a cover of a camera module according to an example embodiment of the present disclosure, and FIG. 20 is a side view of a cover of a camera module according to an example embodiment of the present disclosure.

Referring to FIGS. 19 and 20, a cover 150 may be coupled to the carrier 300. At least a portion of the cover 150 may overlap the lens module 200 accommodated in the carrier 300 in the optical axis (the Z-axis) direction. Therefore, the lens module 200 may be prevented from being separated outwardly from the carrier 300 even when an impact or the like occurs.

The cover 150 may include a first damper member 151 disposed in a region in which the first damper member 151 faces the lens module 200 in the optical axis (the Z-axis) direction. The first damper member 151 may be disposed to protrude from upper and lower surfaces of the cover 150 in the optical axis (the Z-axis) direction. Therefore, even when the cover 150 contacts the case 130 and/or the lens module 200, impact and noise may be alleviated by the first damper member 151.

In addition, the cover 150 may include a second damper member 152 disposed in a region in which the second damper member 152 faces the housing 110 in a direction perpendicular to the optical axis (the Z-axis). The second damper member 152 may be disposed to protrude from the outer and internal surfaces of the cover 150 in a direction perpendicular to the optical axis (the Z-axis). Therefore, even when the cover 150 contacts the lens module 200 and/or the housing 110, impact and noise may be alleviated by the second damper member 152.

The camera module according to one or more example embodiments of the present disclosure as described herein may improve the optical image stabilization function.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:

a housing comprising an internal space;

a carrier disposed in the housing and configured to be movable relative to the housing in a direction perpendicular to an optical axis;

a ball member disposed between the housing and the carrier;

a lens module disposed in the carrier and configured to be movable relative to the carrier in an optical axis direction;

an elastic unit directly connected to the housing, the carrier, and the lens module;

a first conductive pattern disposed in the housing outside the lens module and electrically connected to the elastic unit; and a driving unit configured to apply driving forces to the lens module and the carrier, wherein the driving unit comprises a magnet unit disposed on the carrier, a first coil unit disposed in the lens module, and a second coil unit disposed in the housing.

2. The camera module of claim 1, further comprising a wiring pattern disposed inside the lens module and electrically connected to the first coil unit and the elastic unit.

3. The camera module of claim 2, wherein an end of the wiring pattern is exposed on an upper surface of the lens module and is electrically connected to the elastic unit.

4. The camera module of claim 2, wherein an end of the wiring pattern is exposed on a lower surface of the lens module and is electrically connected to the elastic unit.

5. The camera module of claim 4, wherein the elastic unit comprises a first elastic member connecting an upper surface of the lens module to an upper surface of the carrier and to an upper surface of the housing, and a second elastic member connecting a lower surface of the lens module to a lower surface of the carrier, the second elastic member comprises a first fixed portion coupled to the lower surface of the lens module and a second fixed portion coupled to the lower surface of the carrier, and the end of the wiring pattern exposed on the lower surface of the lens module is electrically connected to the first fixed portion.

6. The camera module of claim 5, further comprising a second conductive pattern disposed inside the carrier, wherein one end of the second conductive pattern is exposed on the upper surface of the carrier, and another end of the second conductive pattern is exposed on the lower surface of the carrier, the one end of the second conductive pattern exposed on the upper surface of the carrier is electrically connected to the first elastic member, and the other end of the second conductive pattern exposed on the lower surface of the carrier is electrically connected to the second fixed portion of the second elastic member.

7. The camera module of claim 1, further comprising:

a column portion disposed in the housing and extending in the optical axis direction; and a wiring pattern is disposed inside the lens module and electrically connected to the elastic unit, wherein the first conductive pattern is disposed in the column portion.

8. The camera module of claim 7, wherein the column portion is disposed in a corner region of the housing.

9. The camera module of claim 7, wherein a guide recess in which the ball member is disposed is formed on either one or both of a surface of the housing and a surface of the carrier facing each other in the optical axis direction, and a maximum distance from a center of the guide recess to an edge of the guide recess is greater than a shortest distance from the center of the guide recess to a sidewall of the guide recess.

10. The camera module of claim 7, wherein the second coil unit comprises a plurality of coils, a plurality of guide recesses in which the ball member is disposed are formed on either one or both of a surface of the housing and a surface of the carrier facing each other in the optical axis direction, each of the guide recesses is disposed between the column portion and a respective coil of the plurality of coils of the second coil unit, a first region is defined by lines extending in a longitudinal direction of each coil of the plurality of coils of the second coil unit along a centerline of each coil and intersecting each other, a second region is defined by lines connecting centers of the plurality of guide recesses to each other, and the second region is inclined relative to the first region.

11. The camera module of claim 10, wherein an area of the first region is greater than an area of the second region.

12. The camera module of claim 1, wherein the elastic unit comprises a first elastic member connecting an upper surface of the lens module to an upper surface of the carrier and to an upper surface of the housing, and a second elastic member connecting a lower surface of the lens module a lower surface of the carrier, the first elastic member comprises a first coupling portion coupled to the upper surface of the lens module, a second coupling portion coupled to the upper surface of the carrier, and a third coupling portion coupled to the upper surface of the housing, and the first conductive pattern is electrically connected to the third coupling portion.

13. The camera module of claim 12, wherein the first elastic member further comprises a first support portion connecting the first coupling portion to the second coupling portion, and a first bent portion and a second bent portion connecting the second coupling portion to the third coupling portion.

14. The camera module of claim 13, wherein the first bent portion and the second bent portion are bent multiple times in a direction perpendicular to the optical axis, and a direction in which the first bent portion is bent and a direction in which the second bent portion is bent are different from each other.

15. The camera module of claim 1, further comprising a yoke member disposed in the housing and facing the magnet unit in the optical axis direction.

16. The camera module of claim 1, wherein the first coil unit and the magnet unit are disposed to face each other in a direction perpendicular to the optical axis, and the second coil unit and the magnet unit are disposed to face each other in the optical axis direction.

17. The camera module of claim 16, wherein the driving unit comprises a first position sensor unit facing the magnet unit in a direction perpendicular to the optical axis, and a second position sensor unit and a third position sensor unit facing the magnet unit in the optical axis direction, and either one of the second position sensor unit and the third position sensor unit comprises two Hall sensors.

18. The camera module of claim 17, wherein the magnet unit comprises a first magnet and a second magnet disposed on an inner side surface of the carrier, the second coil unit comprises a first coil facing the first magnet and a second coil facing the second magnet, and the two Hall sensors each face one of the first magnet and the second magnet in the optical axis direction.

19. The camera module of claim 17, wherein the magnet unit comprises two first magnets spaced apart from each other in a first axis direction perpendicular to the optical axis, and two second magnets spaced apart from each other in a second axis direction perpendicular to both the optical axis and the first axis direction, the second coil unit comprises two first coils facing the two first magnets, respectively, and two second coils facing the two second magnets, respectively, and one of the two Hall sensors faces one of the two first magnets, and another one of the two Hall sensors faces one of the two second magnets.

20. A camera module comprising:

a housing comprising an internal space;

a carrier disposed in the housing and configured to be movable relative to the housing in a direction perpendicular to an optical axis;

a ball member disposed between the housing and the carrier;

a lens module disposed in the carrier and configured to be movable relative to the carrier in an optical axis direction;

an elastic unit directly connected to the housing, the carrier, and the lens module;

a driving unit comprising a magnet unit disposed in the carrier and comprising a plurality of magnets, a first coil unit disposed in the lens module, and a second coil unit disposed in the housing and comprising a plurality of coils;

a first position sensor unit disposed to face the magnet unit in a direction perpendicular to the optical axis; and a second position sensor unit and a third position sensor unit disposed to face the magnet unit in the optical axis direction, wherein the plurality of magnets comprise at least one magnet facing the second position sensor unit, and at least one magnet facing the third position sensor unit and disposed perpendicular to the at least one magnet facing the second position sensor unit, and either one of the second position sensor unit and the third position sensor unit comprises two Hall sensors.

21. The camera module of claim 20, wherein a number of the plurality of coils of the second coil unit is greater than a number of the plurality of magnets.

22. The camera module of claim 20, wherein the two Hall sensors each face one of the plurality of magnets.

23. The camera module of claim 20, wherein the two Hall sensors are disposed to face two different magnets of the plurality of magnets, respectively, and the two different magnets are parallel to each other.

24. The camera module of claim 20, further comprising:

a wiring pattern disposed inside the lens module and electrically connected to the first coil unit and the elastic unit; and a first conductive pattern disposed in the housing outside the lens module and electrically connected to the elastic unit.

25. A camera module comprising:

a housing comprising an internal space;

a carrier disposed in the housing and configured to be movable relative to the housing in a direction perpendicular to an optical axis;

a lens module disposed in the carrier and configured to be movable relative to the carrier in an optical axis direction;

an elastic unit directly connected to the housing, the carrier, and the lens module; and a first conductive pattern disposed in the housing outside the lens module, wherein the elastic unit electrically connects the first conductive pattern to the lens module.

26. The camera module of claim 25, further comprising a ball member disposed between the housing and the carrier, wherein the carrier is disposed on the ball member.

27. The camera module of claim 26, further comprising a guide recess in which the ball member is disposed formed on either one or both of a surface of the housing and a surface of the carrier facing each other in the optical axis direction, wherein a maximum distance from a center of the guide recess to an edge of the guide recess is greater than a shortest distance from the center of the guide recess to a sidewall of the guide recess.

28. The camera module of claim 25, further comprising a driving unit configured to apply driving forces to the lens module and the carrier, wherein the driving unit comprises a magnet unit disposed on the carrier, a first coil unit disposed in the lens module, and a second coil unit disposed in the housing.

29. The camera module of claim 28, further comprising a wiring pattern disposed inside the lens module, wherein the wiring pattern is electrically connected to the first coil unit and the elastic unit.

30. The camera module of claim 28, further comprising:

a first position sensor unit disposed to face the magnet unit in a direction perpendicular to the optical axis; and a second position sensor unit and a third position sensor unit disposed to face the magnet unit in the optical axis direction, wherein the magnet unit comprises first and second magnets disposed perpendicular to each other, the second coil unit comprises first and second coils facing the first and second magnets, respectively, in the optical axis direction, one of the first and second coils comprises multiple coils facing a corresponding one of the first and second magnets, and one of the second position sensor unit and the third position sensor unit comprises a number of position sensors equal to a number of the multiple coils.

31. The camera module of claim 28, wherein the first coil unit faces the magnet unit in a direction perpendicular to the optical axis.

* * * * *